Figure 4:
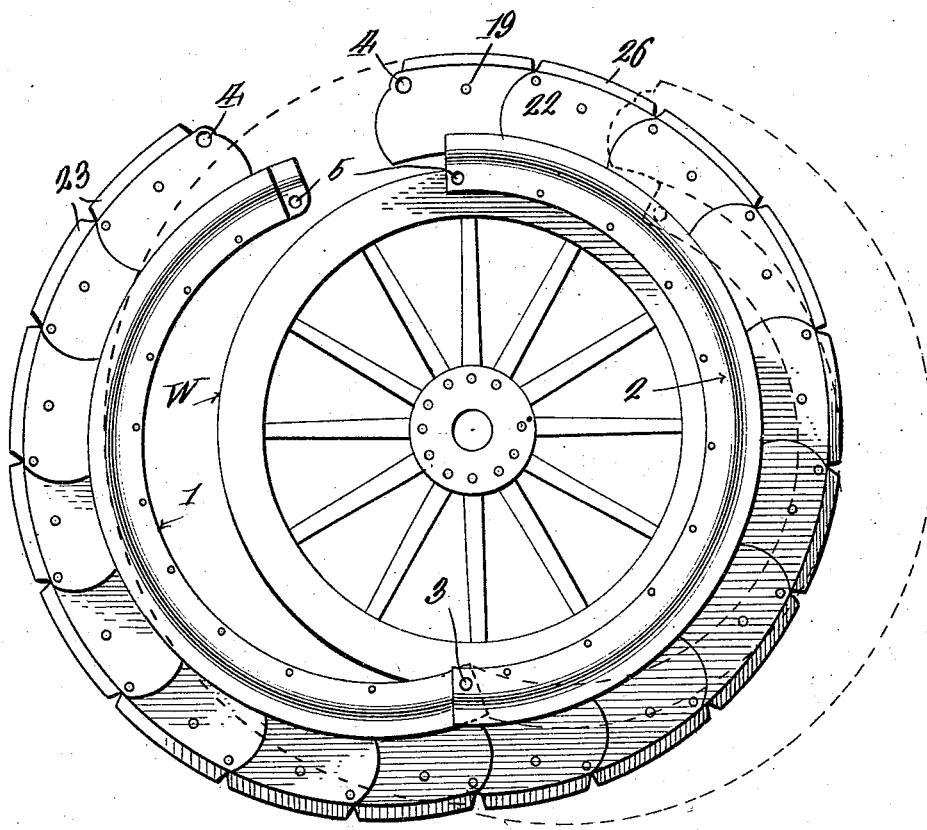

C. O. SNEDEKER.
CUSHION TIRE.
APPLICATION FILED JULY 16, 1920.
1,421,106.
Patented June 27, 1922.
2 SHEETS—SHEET 1.
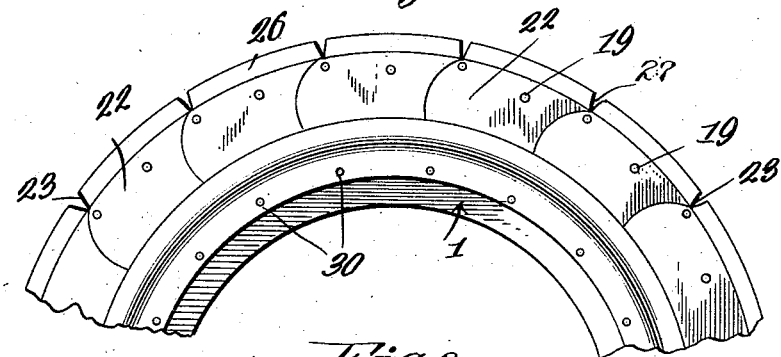
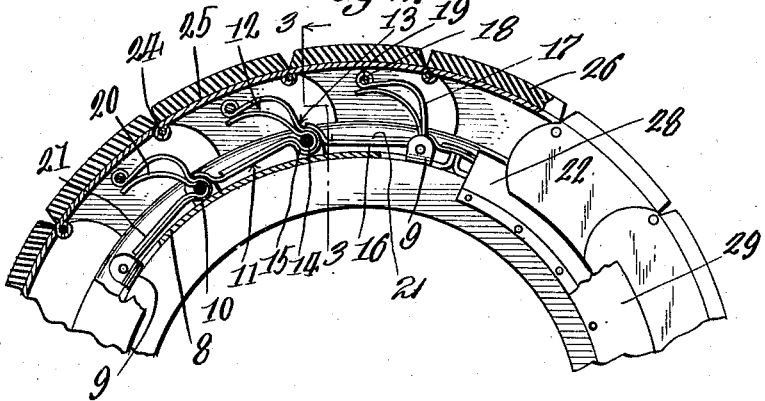
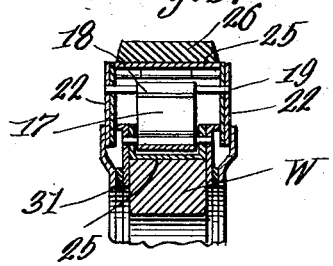
Witnesses
Guy M. Spring
D. M. McColl
Inventor
Charles O. Snedeker
By Richard B. Owen
Attorney

C. O. SNEDEKER.
CUSHION TIRE.
APPLICATION FILED JULY 16, 1920.

1,421,106.

Patented June 27, 1922.
2 SHEETS—SHEET 2.

Witnesses
Guy M. Spring
S. M. McColl

Inventor
Charles O. Snedeker
By Richard B. Owen.
Attorney

UNITED STATES PATENT OFFICE.

CHARLES OLIVER SNEDEKER, OF BLOOMINGTON, ILLINOIS.

CUSHION TIRE.

1,421,106.  Specification of Letters Patent.  Patented June 27, 1922.

Application filed July 16, 1920. Serial No. 396,646.

*To all whom it may concern:*

Be it known that CHARLES OLIVER SNEDEKER, a citizen of the United States, residing at Bloomington, in the county of McLean and State of Illinois, has invented certain new and useful Improvements in Cushion Tires, of which the following is a specification.

This invention relates to vehicle tires, and more particularly to cushion tires.

The object of the invention is to construct a tire of this character having all of the advantages of a pneumatic tire with none of its disadvantages.

Another object is to construct a tire of this character which yields only where the pressure is exerted.

Another object is to construct a tire of this character in hingedly connected sections to facilitate its application, adjustment and removal.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a portion of a tire constructed in accordance with this invention, with the parts in the position assumed when the tire is applied, Fig. 2 is a detail side elevation partly in section showing the interior construction of the tire, Fig. 3 is a transverse section taken on the line 3—3 of Fig. 2, Fig. 4 is a side elevation of a wheel with a tire constructed in accordance with this invention shown partially applied.

In the embodiment illustrated, the tire constituting this invention is shown composed of two semi-circular sections 1 and 2 hingedly connected at one end as shown at 3, and detachably connected at their other ends by bolts, not shown, which are designed to pass through the apertures 4 and 5.

Each of these sections is exactly alike, and hence one only will be described in detail. Each section comprises a channel-shaped rim engaging member adapted to fit around the felloe or rim of a wheel. The flanges of said member lap over the sides of the wheel rim and are secured thereto by means of bolts passing through the registering apertures 5 in the free ends of said sections and through the apertures 4 in the side plates or links presently to be described. The rim engaging plate 8 is provided on its opposite side edges with out-turned apertured ears 9 which form bearings for pintles 10 which are designed for connecting springs 11 on said plate 8. These springs 11 are arranged in series around the outer face of plate 8 and each is composed of an inner member 12 and an outer member 13. The outer member 13 is composed of a strip of spring steel bent intermediately of its ends to form a journal 14 in which a similar journal 15 is mounted, formed on the inner spring 12 which is folded intermediately its ends to provide such journal. The arms of the outer spring 13 diverge and one of them 16 is extended substantially parallel or concentric with plate 8 with its free end curved to fit around a portion of and bear against the journal of the adjacent spring as is shown clearly in Fig. 2, the other arm 17 of spring 13 is bowed outwardly and its terminal is rolled as shown at 18 to form a bearing for a pintle 19. The free end of the outer arm 20 of the inner spring 12 bears against the journal of the pintle 19 on the inner face thereof, and the free end of its other arm 21 conforms to the shape of the inner arm 16 of spring 13, being shorter than said arm and having its terminal engaging the inner end or base of the curved portion of said arm 13. It will thus be seen that by so arranging these springs a cushioning effect will be produced and they will, while having ample resiliency, be sufficiently strong to support heavy weights without becoming distorted. The pintles 19 which extend through the journals at the ends of the spring arms 17 project through links 22 which form the casing or covering for the springs. These links 22 have their ends curved and overlapped as shown clearly in the drawings and in addition to being connected by the pintles 19 are connected by pintles 23 which extend through said links and through journals or knuckles 24 formed at the opposite ends of plate sections 25. These plate sections 25 form the outer wall or tread portion of the spring enclosing casing and have secured to their outer faces rubber tread members 26, one being mounted on each plate 25 and which have their ends bevelled as shown at 27 to provide for the proper yielding of the tire and to cause it to retain its annular or ring-shaped form.

The tread sections 26 which are preferably made of solid rubber operate in connection with the springs to provide the cushioning effect desirable in tires of this character and which produces a wheel sufficiently yieldable to render riding in the vehicle comfortable, and yet all danger of punctures, blowouts and the like is avoided.

This tire is comparatively simple and cheap to manufacture and may be quickly applied to or removed from a wheel in the manner above set forth by simply loosening the bolts which connect the free ends of the sections 1 and 2 and removing the pintle 3 which connects their hinged ends and which also extends through the rim or felloe of the wheel.

The inner edges of the links 22 are disposed between plates 28 and 29 arranged one over the other. The said plates are spaced by rings 31 and are riveted together along their inner edges by the rivets 30 shown in Figures 1 and 4.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. A tire of the class described comprising flexibly connected tread sections, flexibly connected links secured to the side edges of said tread sections, a rim encircling member, and springs arranged between said tread and rim members and connected with said rim member and with said links.

2. A tire of the class described comprising flexibly connected tread sections, flexibly connected links secured to the side edges of said tread sections, a rim encircling member, and pairs of yieldably connected springs arranged between said tread and rim members and connected with said rim member and with said links.

3. A tire of the class described comprising flexibly connected tread sections, flexibly connected links secured to the side edges of said tread sections, a rim encircling member, and springs arranged between said tread and rim members and connected with said rim member and with said links, said springs being composed of pairs of substantially V-shaped members arranged one within the other with journals at their apices, pintles connecting said journals to said rim member, a pintle connecting an arm of each outer spring member to the links on opposite sides of the tire, the other arm engaging the journal of an adjacent spring.

4. A tire of the class described comprising flexibly connected tread sections, flexibly connected links secured to the side edges of said tread sections, a rim encircling member, and springs arranged between said tread and rim members and connected with said rim member and with said links, said springs being composed of pairs of substantially V-shaped members arranged one within the other with journals at their apices, pintles connecting said journals to said rim member, a pintle connecting an arm of each outer spring member to the links on opposite sides of the tire, the other arm engaging the journal of an adjacent spring, the arms of the inner spring member being shorter than those of the outer and yieldably engaged therewith.

In testimony whereof I affix my signature in presence of two witnesses.

CHARLES OLIVER SNEDEKER.

Witnesses:
J. C. PARISH,
H. J. MOREHART.